United States Patent [19]

Saha et al.

[11] Patent Number: 5,257,644
[45] Date of Patent: Nov. 2, 1993

[54] HOT TAP CUTTER FOR PLASTIC PIPE

[75] Inventors: Narayan C. Saha, Lake Villa; James E. Huebler, Brookfield, both of Ill.

[73] Assignee: Institute of Gas Technology, Chicago, Ill.

[21] Appl. No.: 897,878

[22] Filed: Jun. 12, 1992

[51] Int. Cl.⁵ ............................................. F16K 43/00
[52] U.S. Cl. ......................................... 137/318; 83/171
[58] Field of Search .................. 83/16, 55, 83, 745, 83/171; 137/318; 285/197, 198, 199; 29/426.3, 426.4; 30/140, 92

[56] References Cited

U.S. PATENT DOCUMENTS

| | | |
|---|---|---|
| 2,676,604 | 4/1954 | Senna . |
| 3,465,627 | 9/1969 | Vigneault ............................. 83/171 |
| 3,546,742 | 12/1970 | Kugler . |
| 3,599,623 | 8/1971 | Ver Nooy ............................. 137/318 |
| 4,051,734 | 10/1977 | Harcuba et al. ..................... 83/171 |
| 4,063,844 | 12/1977 | Pessia ................................. 137/318 |
| 4,204,447 | 5/1980 | Slaughterbeck . |
| 4,270,559 | 6/1981 | Wallberg . |
| 4,331,170 | 5/1982 | Wendell .............................. 137/318 |
| 4,343,111 | 8/1982 | Inoue . |
| 4,449,434 | 5/1984 | Johnson . |
| 4,655,480 | 4/1987 | Thalmann . |
| 4,667,552 | 5/1987 | Calligarich . |
| 4,992,639 | 2/1991 | Watkins et al. . |
| 5,159,865 | 11/1992 | Hinckley ............................... 83/16 |

Primary Examiner—Eugenia Jones
Assistant Examiner—Allan M. Schrock
Attorney, Agent, or Firm—Speckman, Pauley & Fejer

[57] ABSTRACT

An apparatus for hot tap cutting of plastic pipe comprising an electrode having a cutting edge, means for heating said electrode, and an insulating sheath, means for controlling movement of the electrode, and a housing containing the electrode, said housing sealingly securable to at least a portion of a plastic pipe whereby fluid pressure is maintained in the plastic pipe.

8 Claims, 3 Drawing Sheets

HOT TAP CUTTER FOR PLASTIC PIPE

BACKGROUND OF THE INVENTION

1. Field of the Invention

This invention relates to an apparatus and process for hot tapping of non-conductive pipes, such as polyethylene pipes, in in-service pipelines without taking said pipelines out of service.

2. Description of the Prior Art

Hot tapping of in-service pipelines is used to add valves, regulators, branch connections, and other devices to existing pipelines as well as to make in-service repairs on such pipelines. In hot tapping an in-service pipeline, it is necessary to cut an opening in the pipe for insertion of the valve or regulator, or connection of a branch pipe. To prevent fluid within the pipe from escaping, a hot tap saddle is sealingly secured to the pipe around the portion of the pipe in which the hole is to be made. The saddle is provided with a gate valve or other means for providing access to the pipe without permitting fluid to escape from the pipe. A saddle suitable for such purpose is taught by U.S. Pat. No. 4,655,480.

To make the necessary hole in an in-service pipe, it is known to use mechanical cutters. However, the use of mechanical cutters creates chips which can fall into the pipe and be entrained in the fluid stream, eventually lodging in valve seats and meter diaphragms. In addition, mechanical hot tapping equipment is necessarily large and heavy to provide the necessary cutting torque. With plastic pipe, in particular, the application of such torque is undesirable as it unnecessarily loads the pipe. Furthermore, with mechanical cutters, stress is created at the edge of a cut resulting, in practice, in openings having an area less than the transverse cross-sectional area of the hot tap apparatus through which the mechanical cutter is inserted. In addition, and more importantly, the hole shapes made by mechanical cutters are generally limited to circles. But see U.S. Pat. No. 4,270,559 and U.S. Pat. No. 2,676,604, both of which teach non-circular openings in pipes for insertion of a cylindrical flat valve member.

In plastic pipes, in particular, non-circular openings provide a substantial benefit over circular openings for hot tapping to add valves, regulators, branch connections and other devices, particularly with respect to the saddle fittings used in hot tapping. To provide the necessary joint strength between the saddle fitting and the pipe, a large amount of heat fusion surface area on the pipe around the opening is important. On the other hand, the amount of fluid passing through the fitting is proportional to the area of the opening. These requirements conflict with one another with circular openings. As the diameter of a circular opening increases to the internal diameter of the pipe, thereby increasing the amount of fluid that can flow through the opening into, for example, a branch connection, the joint formed by the saddle fitting and the plastic pipe gets weaker. Conversely, as the diameter of a circular opening decreases, thereby increasing the strength of the joint, the amount of fluid flowing through the opening decreases. The use of an elliptical opening with its major axis parallel to the axis of the pipe permits a strong joint with high fluid flow. In addition, non-circular openings permit the use of advanced flow stopping techniques, such as soft-seated gate-type stoppers which induce only minimal stresses in the low strength plastic pipe.

To provide holes in plastic material, in addition to using mechanical cutters, it is generally known to use heated devices. U.S. Pat. No. 4,204,447 teaches a punching apparatus using a heated punch to perforate a corrugated plastic pipe to create circular holes. U.S. Pat. No. 3,546,742 teaches a method of perforating flexible thermoplastic material using induction heated, thin probes. U.S. Pat. No. 4,667,552 teaches an apparatus for perforating thermoplastic film material with heated perforation pins. Finally, U.S. Pat. No. 4,449,434 discloses an apparatus for cutting holes and notches in thermoplastic films using heated steel rule dies. However, none of these devices is suitable for hot tapping an in-service plastic pipeline. In addition, none of these devices is capable of producing non-circular openings in in-service plastic pipes.

To enhance the effectiveness of mechanical cutters in machining and drilling, it is generally known to use ultrasonic vibrations as taught by U.S. Pat. No. 4,343,111 in which an ultrasonically vibrating tool is positioned across the cutting front of the work piece, the vibration resulting in removal of material from the cutting front of the work piece. Similarly, U.S. Pat. No. 4,992,639 discloses the combination of electric discharge machining and ultrasonic drilling to drill holes in metal components having a nonconductive element, in particular, a ceramic surface layer. However, the use of such vibrating tools for use in cutting holes in plastic materials, in particular, plastic pipe, is not taught by the known prior art.

SUMMARY OF THE INVENTION

It is an object of this invention to provide an apparatus and process which are suitable for use in cutting openings in in-service plastic pipelines, in particular, for hot tapping in situ plastic pipes in ga pipelines.

It is another object of this invention to provide a process and apparatus which can cut openings of any shape through the walls of an in-service plastic pipe.

It is another object of this invention to provide a process and apparatus for hot tapping in situ plastic pipes which does not produce chips which may fall into the pipe.

It is yet another object of this invention to provide a process and apparatus for hot tapping in situ plastic pipes in which no torque is applied to the pipe.

It is yet another object of this invention to provide a process and apparatus for hot tapping in situ plastic pipes in which the edges of an opening cut in the pipe are smooth, providing a better surface for sealing plugs.

It is yet another object of this invention to provide a process and apparatus for hot tapping in situ plastic pipes in which pressure is maintained within the plastic pipe at all times and fluid is prevented from escaping from the plastic pipe.

It is yet another object of this invention to provide a process and apparatus for hot tapping in situ plastic pipes which does not employ mechanical cutters.

It is yet another object of this invention to provide a process and apparatus for hot tapping in situ plastic pipes which produces an opening in said plastic pipes having an area equivalent to the transverse cross-sectional area of the hot tap fitting.

These and other objects are achieved, in accordance with one embodiment of this invention, by an apparatus for hot tap cutting of plastic pipe comprising an electrode having a cutting edge and an insulating sheath, and means for heating said electrode. Means for controlling movement of the electrode are operatively connected to the electrode. A power supply is connected to the electrode which provides power for raising the temperature of the electrode above the melting point of the plastic pipe into which the opening is to be cut. The power supply also provides power for moving the electrode from one position to another. Each of the electrode, means for controlling movement of the electrode, and the power supply are contained in a housing which can be sealingly secured to at least a portion of the plastic pipe such that fluid escaping from the pipe during the cutting operation is contained within the housing, thereby maintaining fluid pressure within the plastic pipe and preventing leakage of the fluid into the atmosphere. In accordance with another embodiment of this invention, the power supply is disposed external to the housing and provides power through cables which run through a fluid tight cable feedthrough in a wall of the housing into the housing.

In accordance with a preferred embodiment of this invention, the electrode is in the form of a hollow body having at least one open end. The open end has a shape which corresponds to the shape of the opening to be cut in the pipe. The cutting edge of the electrode is disposed at the open end of the electrode.

In accordance with a preferred embodiment of this invention, means for vibrating the electrode are mechanically linked to the electrode. Thus, as the electrode melts the plastic to form the desired opening in the plastic pipe, the electrode may be vibrated to enhance the cutting process.

To prevent the coupon formed by the melting of the plastic pipe at the periphery of the opening from falling into the pipe, the electrode is provided with a means for holding the coupon such that when the electrode is removed from the housing, the coupon may be withdrawn at the same time.

In the process for hot tap cutting of plastic pipe in accordance with this invention, a housing containing an electrode having a cutting edge and an insulating sheath, means for heating said electrode, and means for controlling movement of the electrode operatively connected to the electrode is sealingly connected to said pipe around the portion of the pipe in which an opening is to be cut. The electrode is moved by said means for controlling movement of the electrode to contact the surface of the plastic pipe. The electrode is heated to a temperature in excess of the melting temperature of the plastic pipe whereby an opening is melted in the plastic pipe. The coupon produced by such melting is then removed from the opening.

BRIEF DESCRIPTION OF THE DRAWINGS

These and other objects and features of this invention will be more readily understood and appreciated from the description and drawings contained herein, wherein.

DESCRIPTION OF PREFERRED EMBODIMENTS

Figure 1:
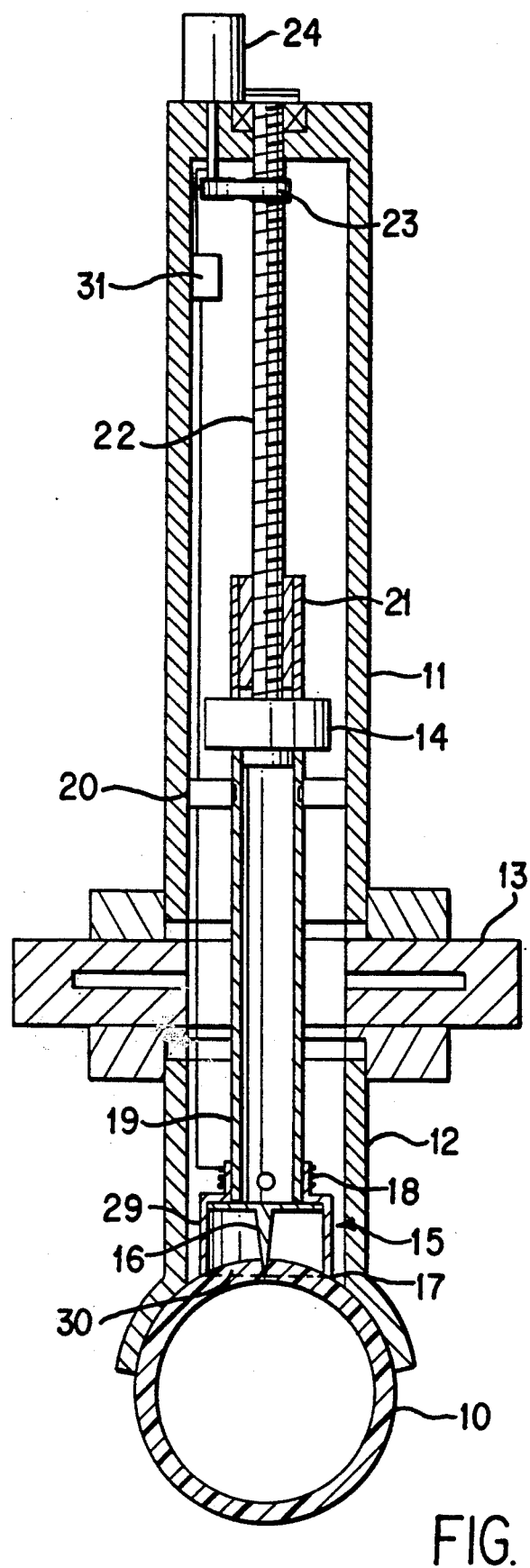
FIG. 1 is a schematic diagram of the invention on a plastic pipe in accordance with one embodiment of this invention.

FIG. 1 shows an apparatus for hot tap cutting of plastic pipe in accordance with one embodiment of this invention. The apparatus comprises electrode 15 secured to one end of shaft 19, the other end of which is mechanically linked to vibrator 14.

Electrode 15 comprises electrode wall 29 which forms a hollow body having at least one open end 30. Open end 30 has a shape corresponding to the shape of a opening to be cut in the wall of plastic pipe 10. Thus, if it is desired to cut an elongated opening in the wall of plastic pipe 10, then open end 30 of electrode 15 has an elongated shape. Or, if it is desired to cut a circular opening in the wall of plastic pipe 1, then open end 30 of electrode 15 has a circular shape. Secured to electrode 15 and extending from the hollow body thereof is coupon holder 16 which extends longitudinally beyond the length of electrode wall 29 toward plastic pipe 10.

Figure 3:
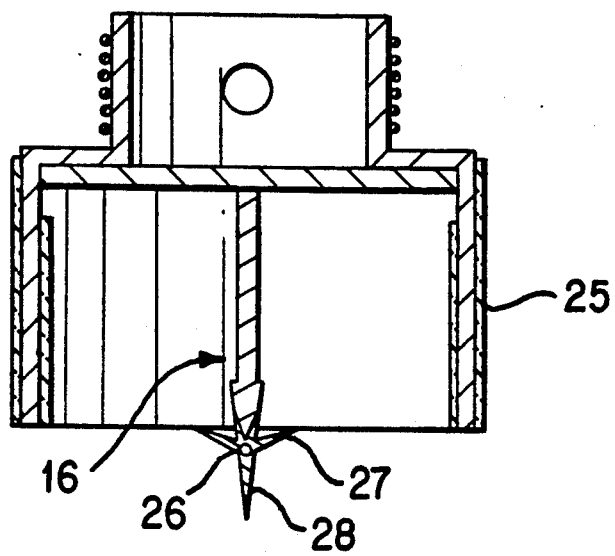
FIG. 3 is a cross sectional side view of an electrode for cutting an opening in a plastic pipe in accordance with one embodiment of this invention.

As shown in FIG. 3, coupon holder 16 comprises puncture blade 28 and at least one arm 27 pivotally secured around pivot 26 to puncture blade 28. In a preferred embodiment of this invention, coupon holder 16 is heated. As electrode 15 is brought into contact with the wall of plastic pipe 10, puncture blade 28 wedges into the wall of plastic pipe 10 and passes into the interior of plastic pipe 10. After puncture blade 28 has passed through the wall of plastic pipe 10, arm 27 opens up to catch the coupon resulting from electrode 15 cutting through the wall of plastic pipe 10. In this manner, the coupon is prevented from falling into plastic pipe 10.

In accordance with one embodiment of this invention, arm 27 is spring-loaded to open after puncture blade 28 has passed through the wall of plastic pipe 10. In accordance with another embodiment of this invention, arm 27 is weighted to open automatically after puncture blade 28 has passed through the wall of plastic pipe 10. In accordance with yet another embodiment of this invention, puncture blade 28 is heated, melting the plastic, to facilitate its passage through the wall of plastic pipe 10 and subsequently cooled, resulting in the molten plastic solidifying and adhering to puncture blade 28, holding the coupon for removal.

As shown in FIG. 3, in accordance with one embodiment of this invention, electrode 15 is coated with insulating layer 25, preferably a non-sticking material to reduce the friction as electrode 15 passes through the wall of plastic pipe 10 and to reduce the likelihood of melted plastic sticking to electrode 15. In addition, insulating layer 25 may prevent continued heating and possible thermal degradation or undesirable material flow around the surfaces already cut.

To enable electrode 15 to melt its way through the wall of plastic pipe 10, electrode 15 is provided with means for heating said electrode 15. In accordance with one embodiment of this invention, electrode 15 is provided with heating element 18 connected to power supply 31. Heating element 18, thus, heats electrode 15 to a temperature required to melt the wall of plastic pipe 10.

In accordance with yet another embodiment of this invention, electrode 15 is constructed of a material having a high electrical conductivity, preferably in the range of about 0.5 watts cm$^{-1}$ K$^{-1}$ to about 4.0 watts cm$^{-1}$K$^{-1}$, such as high conductivity copper or aluminum. In this case, electrode 1 is connected directly to power supply 31 and electric current passing through electrode 15 heats electrode 15 to the temperature required for melting the wall of plastic pipe 10.

To provide an effective seal around the opening to be cut in the pipe wall of plastic pipe 10, the apparatus of this invention uses some of the same parts as conventional hot tap equipment, such as pressure confining components and valves. In accordance with one embodiment of this invention, electrode 15, means for heating electrode 15, means for controlling movement of electrode 15 operatively connected to said electrode, and means for electronically controlling the apparatus of this invention are contained within a housing comprising upper housing 11 and lower housing 12 in the form of a saddle fitting. Disposed between upper housing 11 and saddle fitting 12 is gate valve assembly 13 which connects upper housing 11 to saddle fitting 12. Saddle fitting 12 is sealingly secured to plastic pipe 10 in such a manner that fluid leaking from plastic pipe 10 as electrode 15 melts through the wall of plastic pipe 10 is contained within the housing.

Figure 4:
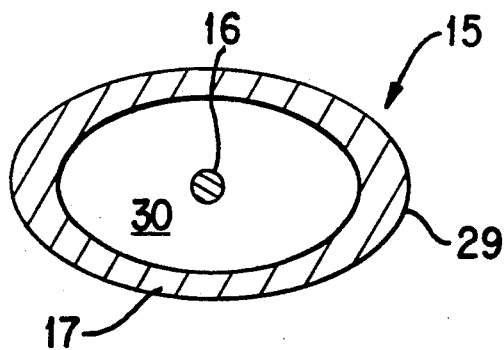
FIG. 4 is a view of an electrode as shown in FIG. 2 in the direction of I—I.

A significant feature of this invention is electrode 15 having open end 30 which can have any shape, preferably non-circular, corresponding to the shape desired for the opening in the wall of plastic pipe 10. It is particularly beneficial that open end 30, in accordance with one embodiment of this invention as shown in FIG. 4, has an elongated shape. An elongated opening in plastic pipe 10 enables a strong joint to be formed between the pipe and the saddle fitting, and thus also any branch connection made thereto, without substantially limiting fluid flow therethrough. In addition, such a non-circular opening permits the use of new, improved stopping methods for plastic pipes and new, improved plastic fittings for plastic pipes. The use of electrode 15, rather than a mechanical cutter, results in less stress at the edge of the cut and facilitates making larger holes. A larger opening will permit greater fluid flow and reduced pressure drop across the fitting. A larger opening also permits the use of a larger elastomer flow stopper. A larger elastomer flow stopper does not have to expand as much to complete a seal, thereby reducing the forces and stress on the plastic pipe.

Electrode 15 is mechanically linked to means for controlling its movement disposed in said upper housing 11. Through said means for controlling movement of electrode 15, electrode 15 is retractable into upper housing 11, thereby permitting gate valve assembly 13 to be closed, separating the inside of upper housing 11 from the inside of saddle fitting 12 and effectively sealing saddle fitting 12 around plastic pipe 10, thereby insuring that fluid pressure is maintained in plastic pipe 10. Upper housing 11 together with electrode 15, and means for controlling movement of electrode 15, as well as vibrator 14, can then be disconnected from lower housing 12 for use at another site.

In a preferred embodiment of this invention, said means for controlling movement of electrode 15 comprises motor 24 connected through belt and pulley assembly 23 to ball screw 22 which is mateable with ball nut 21. As motor 24 turns, ball screw 22 is correspondingly turned within ball nut 21 to raise and lower electrode 15. To prevent electrode 15 from rotating as it is raised and lowered, shaft guide 20 is disposed between the wall of upper housing 11 and electrode mounting shaft 19, thereby guiding electrode 15 straight into plastic pipe 10.

It will be apparent to those skilled in the art that other means for controlling movement of electrode 15 are suitable, such as, a hydraulic system (not shown).

Figure 2:
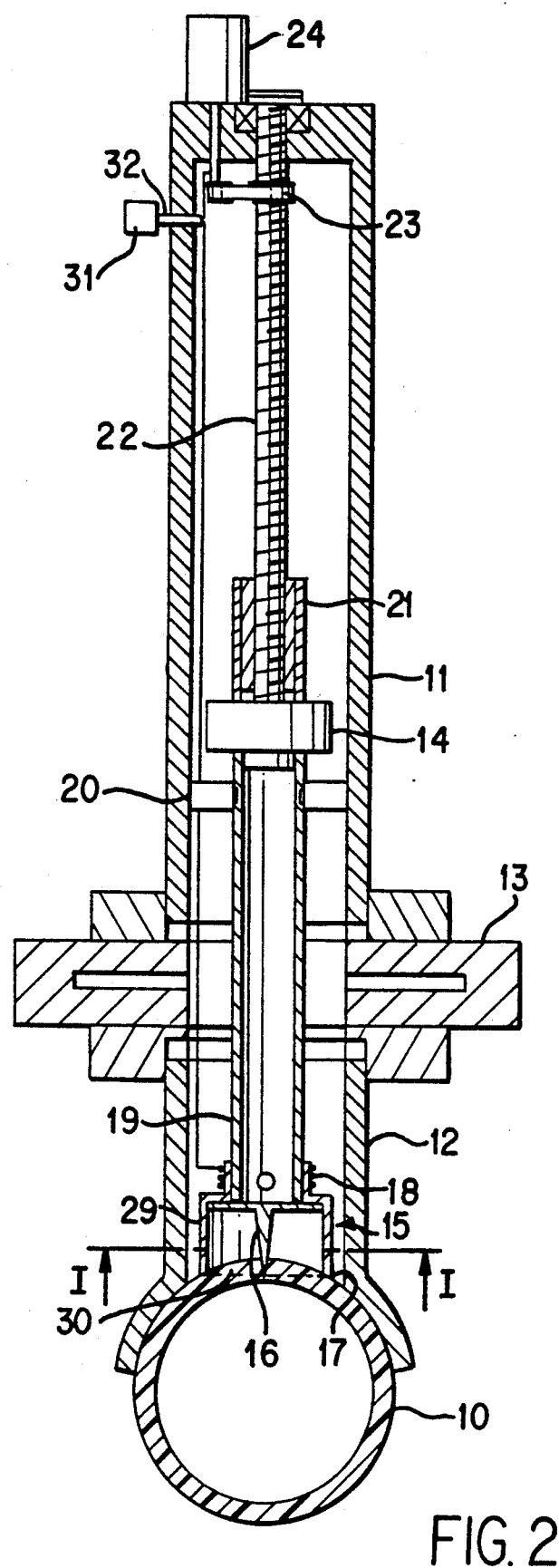
FIG. 2 is a schematic diagram of the invention on a plastic pipe in accordance with another embodiment of this invention.

Motor 24 is electrically connected to power supply 31, which is also connected through fluid tight cable feedthrough 32 to heating element 18 as shown in FIG. 2. In addition, power supply 31 provides electricity to electrode 15 or heating element 18 for heating of electrode 15.

Vibrator 14, preferably a piezoelectric ultrasonic vibrator, is attached to electrode mounting shaft 19 to vibrate electrode 15 and thus improve the speed and quality of the cut.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principals of the invention.

We claim:

1. An apparatus for hot tap cutting of plastic pipe comprising:

a housing including an upper housing and a lower housing, said lower housing including a hot tap saddle having a gate valve assembly, said hot tap saddle sealingly securable around at least a portion of said plastic pipe;

an electrode having a cutting edge and a continuous wall which is coated with a non-sticking material disposed within said housing, said continuous wall of said electrode forming a hollow body having at least one open end, said open end having a shape of an opening to be cut in said pipe, and said cutting edge formed by said wall at said open end of said electrode;

a heated puncture element comprising a puncture bland and comprising at least one arm pivotally connected to said blade and adapted to extend laterally below a coupon after said puncture element pierces said coupon said puncture element having secured inside said hollow body and extending longitudinally beyond the open end of said continuous wall;

means for heating said electrode in contact with said electrode; and means for controlling movement of said electrode operatively connected to said electrode and disposed within said housing.

2. An apparatus for hot tap cutting of plastic pipe according with claim 1 further comprising means for vibrating said electrode mechanically liked with said electrode.

3. An apparatus for hot tap cutting of plastic pipe in accordance with claim 1, wherein said open end of said electrode has a non-circular shape.

4. An apparatus for ho tap cutting of plastic pipe in accordance with claim 1, wherein said means for controlling said electrode comprises a DC motor and a threaded means for raising and lowering said electrode, said threaded means operatively connected to said electrode, and said DC motor driving said threaded means.

5. An apparatus for hot tap cutting of plastic pipe in accordance with claim 2, wherein said means for vibrating said electrode comprises a vibratory head.

6. An apparatus for hot tap cutting of plastic pipe in accordance with claim 1, wherein said upper housing is sealingly secured to said lower housing, said upper housing being in communication with said lower housing when said gate valve assembly is in an open position.

7. An apparatus for hot tap cutting of plastic pipe in accordance with claim 1, wherein said electrode is constructed of a material having a high electrical conductivity.

8. An apparatus for hot tap cutting of plastic pipe in accordance with claim 1, wherein said electrode is constructed of at least one of high conductivity copper and high conductivity aluminum.

* * * * *